April 22, 1924.
G. ERNST
TRY COCK
Filed Jan. 30, 1922
1,491,594
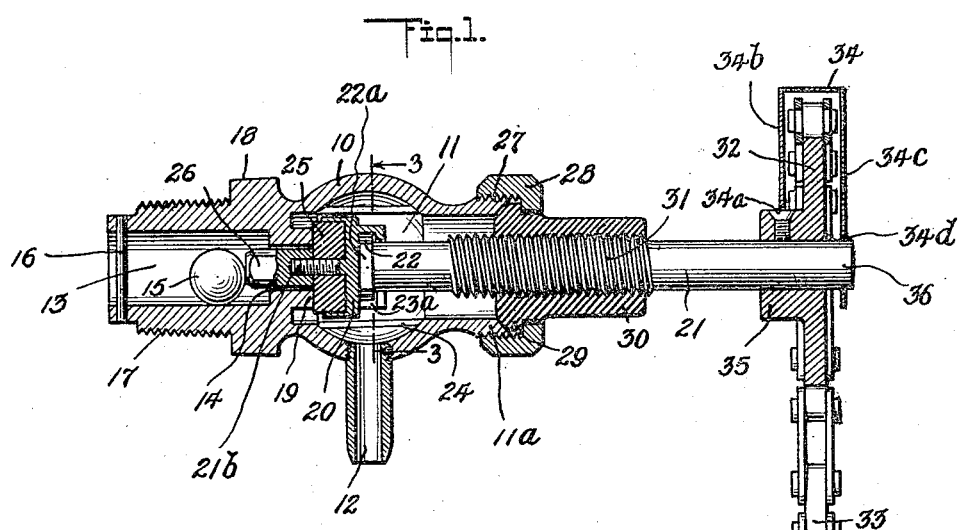
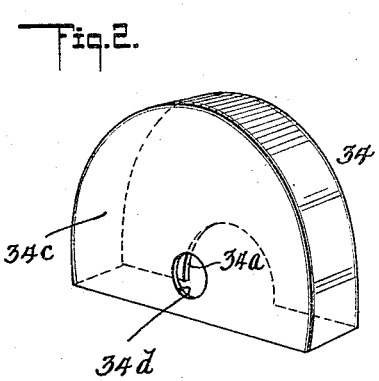
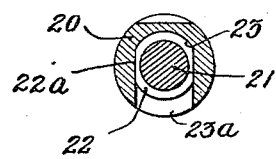
INVENTOR
Geo. Ernst
BY Geo. V. Beeler
ATTORNEY Patented Apr. 22, 1924.

1,491,594

UNITED STATES PATENT OFFICE.

GEORGE ERNST, OF NEWARK, NEW JERSEY.

TRY COCK.

Application filed January 30, 1922. Serial No. 532,687.

*To all whom it may concern:*

Be it known that I, GEORGE ERNST, a citizen of the United States, residing at Newark, in the county of Essex and State of New Jersey, have invented certain new and useful Improvements in Try Cocks, of which the following is a specification.

This invention relates to that type of valves known usually as try cocks, used particularly on steam boilers, and has particular reference to the mechanism for actuating the valve from a distance.

Among the objects of the invention is to provide for the means for actuating a valve from a distance, including a wheel and chain, means of a peculiarly simple and advantageous nature for retaining the chain on the wheel, preventing it from rolling or jumping from the periphery of the wheel in practice.

Another object of the invention is to provide a valve of the character described which is efficient in operation to a high degree and is comparatively cheap to manufacture.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of a valve embodying my invention.

Fig. 2 is a perspective view of the casing provided on the opening and closing wheel of the valve.

Fig. 3 is a section taken along the line 3—3 of Fig. 1.

Referring in detail to the drawings 10 indicates the valve body having the usual valve chamber 11, outlet 12 and inlet 13. The latter communicates with the valve chamber by means of the smaller opening or passage 14 and is provided with a ball 15 whereby the passage 14 may be closed, the pressure of the water or steam behind the ball 15 forcing it against the inlet end of the passage and closing it when the valve mechanism is removed. A pin 16 is provided for preventing the ball valve 15 from falling out, and said pin is secured in the smooth cylindrical inner end of the connection. The valve body is exteriorly threaded as at 17 adjacent to the boiler end thereof and is formed with a hexagonal shoulder 18 whereby the valve may be fitted securely on the boiler. Surrounding the end of the connecting passage 14 adjacent to the valve chamber 11 is a valve seat 19 adapted to receive thereon a valve head 20. The latter is carried by the valve stem 21 having a collar 22 formed thereon within the valve chamber 11. The valve head is formed with a slot 23 to receive the collar 22 through the open end 23$^a$ of the slot by a lateral motion. Ribs 24 are provided for holding the valve head in position on the valve stem. The other end of the valve head is formed as a socket to receive the washer or disk 25. A screw 21$^b$ extends from the valve head through said disk and a nut in the nature of a reamer 26 formed preferably of hexagonal cross section is screwed firmly upon the screw.

The free end 11$^a$ is externally threaded as at 27 for the coupling 28 in which is disposed the flange 29 of an interiorly threaded sleeve 30. The latter is adapted to engage the externally threaded portion 31 of the valve stem 21.

At the free end of the valve stem a sprocket wheel 32 is provided and adapted to be operated by a chain 33 suspended therefrom so that the valve may be operated from a position below the same. To prevent the chain slipping or becoming loose from the sprocket wheel a casing 34 is provided. The latter is semicircular (see Fig. 2) and has the opening 34$^a$ cut on the inner face 34$^b$ thereof whereby the casing rests on the hub 35 of the wheel. The outer face 34$^c$ of the casing is flexible and has an opening 34$^d$ formed therein so as to snap over and be held in place by the extended end 36 of the stem 21. While the guard casing more or less closely embraces the upper side of the wheel it is free to float around the axis of the stem, according to the direction in which the chain may be drawn. There is no possibility, however, for the guard to interfere with the movement of the chain for the reason that any tendency of the guard to topple or rotate around the axis of the stem is always in the direction of movement of that portion of the chain against which the edge of the guard may be in engagement.

I claim:

1. In combination with a rotary stem, a wheel fixed to the stem, and a flexible member operating over the periphery of the wheel for rotating the same, of a guard to prevent displacement of such flexible member, said guard being of general semi-cylindrical shape and freely embracing one side of the wheel and having an outer resilient wall having an opening for receiving the outer end of the stem when said wall is snapped thereover to hold the guard in place.

2. In try cock mechanism, the combination with a valve and a stem for actuating it, of a wheel fixed to the stem close to but spaced from the end of the stem, a flexible member operating over the wheel for turning the same and the stem from a distance, and a guard to prevent displacement of the flexible member from the wheel, said guard fitting close over the upper half of the wheel and having a flexible front face having an opening to receive the free end of the stem when snapped thereover, whereby the guard is held in place.

In testimony whereof I affix my signature.

GEORGE ERNST.